(12) United States Patent
Grace et al.

(10) Patent No.: US 10,843,545 B2
(45) Date of Patent: Nov. 24, 2020

(54) CONNECTED BATTERY PACK ASSEMBLY AND CONNECTING METHOD

(71) Applicant: Ford Global Technologies, LLC, Dearborn, MI (US)

(72) Inventors: Ihab Grace, Grosse Pointe Woods, MI (US); Abdelmonaam Sassi, Windsor (CA); Shekar Prabhakar Erasala, Northville, MI (US); Ahteram Khan, Canton, MI (US); Sean Brady, Royal Oak, MI (US); John Jardine, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/364,578

(22) Filed: Mar. 26, 2019

(65) Prior Publication Data
US 2020/0307366 A1 Oct. 1, 2020

(51) Int. Cl.
*B60K 1/04* (2019.01)
*B60L 50/60* (2019.01)

(52) U.S. Cl.
CPC ............. *B60K 1/04* (2013.01); *B60L 50/66* (2019.02); *B60K 2001/0438* (2013.01)

(58) Field of Classification Search
CPC .......... B60K 2001/0438; B62D 21/157; B60Y 2306/01
See application file for complete search history.

(56) References Cited

U.S. PATENT DOCUMENTS

| | | | |
|---|---|---|---|
| 7,488,017 B2 | 2/2009 | Lassl et al. | |
| 8,424,960 B2 | 4/2013 | Rawlinson et al. | |
| 8,696,051 B2 * | 4/2014 | Charbonneau | B62D 21/157 296/187.12 |
| 9,493,190 B1 * | 11/2016 | Alwan | B60K 1/04 |
| 9,505,422 B2 | 11/2016 | Wu et al. | |
| 9,673,433 B1 | 6/2017 | Pullalarevu et al. | |
| 9,926,017 B1 * | 3/2018 | Hamilton | B62D 27/02 |
| 10,065,491 B1 | 9/2018 | Syed et al. | |
| 10,494,030 B1 * | 12/2019 | Paramasivam | B62D 25/20 |
| 10,559,795 B1 * | 2/2020 | Madasamy | B60K 1/04 |
| 10,618,562 B2 * | 4/2020 | Shimizu | B62D 25/082 |

(Continued)

FOREIGN PATENT DOCUMENTS

JP H07156831 6/1995

*Primary Examiner* — Brian L Swenson
(74) *Attorney, Agent, or Firm* — David Kelley, Esq.; Carlson, Gaskey & Olds, P.C.

(57) ABSTRACT

A connected assembly can include, among other things, first and second side rails of a battery pack of an electrified vehicle. The battery pack including a plurality of battery arrays disposed between the first and second side rails within an enclosure assembly. The connected assembly further includes a lateral rail extending from the first side rail to the second side rail, and a bracket assembly directly connected to the first side rail and the lateral rail. A battery pack connection method can include, among other things, directly connecting a bracket assembly to a horizontally facing side of a lateral rail, and directly connecting the bracket assembly to a horizontally facing side of a first side rail of an enclosure assembly that holds a battery pack of an electrified vehicle between the first side rail and a second side rail.

18 Claims, 5 Drawing Sheets

(56) References Cited

U.S. PATENT DOCUMENTS

| | | |
|---|---|---|
| 2002/0153749 A1 | 10/2002 | Lee |
| 2007/0152474 A1 | 7/2007 | Lassl et al. |
| 2012/0153682 A1 | 6/2012 | Rawlinson et al. |
| 2012/0161472 A1 | 6/2012 | Rawlinson et al. |
| 2016/0226041 A1* | 8/2016 | Jackson .............. H01M 10/625 |
| 2017/0029034 A1* | 2/2017 | Faruque ............. H01M 2/1083 |
| 2018/0370577 A1* | 12/2018 | Takahashi .......... B62D 25/2018 |
| 2019/0329823 A1* | 10/2019 | Lutz .................... B62D 29/046 |

* cited by examiner

CONNECTED BATTERY PACK ASSEMBLY AND CONNECTING METHOD

TECHNICAL FIELD

This disclosure relates generally to a connected assembly and, more particularly, to a connected assembly having a bracket that secures together areas of a battery pack.

BACKGROUND

Generally, electrified vehicles can differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain for an electrified vehicle can include a high-voltage battery pack having battery cells that store electric power for powering the electric machines and other electrical loads of the electrified vehicle. The battery pack can be secured to an underbody, or another area, of an electrified vehicle.

SUMMARY

A connected assembly according to an exemplary aspect of the present disclosure includes, among other things, first and second side rails of a battery pack of an electrified vehicle. The battery pack including a plurality of battery arrays disposed between the first and second side rails within an enclosure assembly. The connected assembly further includes a lateral rail extending from the first side rail to the second side rail, and a bracket assembly directly connected to the first side rail and the lateral rail.

In another example of the preceding connected assembly, the bracket assembly is a first bracket assembly. The connected assembly further includes a second bracket assembly directly connected to the second side rail and the lateral rail.

In another example of any of the preceding connected assemblies, the lateral rail interfaces with the first rail along a vertically extending interface. Also, the bracket assembly extends over the vertically extending interface.

In another example of any of the preceding connected assemblies, the bracket assembly is directly connected to a horizontally facing side of the first side rail and a horizontally facing side of the lateral rail.

In another example of any of the preceding connected assemblies, the lateral rail is a first lateral rail that is rearward of the enclosure assembly relative to an orientation of the electrified vehicle.

In another example of any of the preceding connected assemblies, the battery pack is secured to an underbody of the electrified vehicle.

Another example of any of the preceding connected assemblies includes a driver side vehicle rocker and a passenger side vehicle rocker. The first side rail is secured directly to the driver side vehicle rocker. The second side rail is secured directly to the passenger side vehicle rocker.

In another example of any of the preceding connected assemblies, the bracket is directly connected to a horizontally facing side of the first side rail and a vertically facing side of the lateral rail.

In another example of any of the preceding connected assemblies, the bracket is a single, continuous bracket.

Another example of any of the preceding connected assemblies includes at least one fastener having a head and a shaft extending from the head. The head is held by the bracket between the bracket and the lateral rail. The shaft extends through an aperture in the bracket.

Another example of any of the preceding connected assemblies includes a suspension component of the electrified vehicle. The at least one fastener is secured directly to the suspension component.

A battery pack connection method according to another exemplary aspect of the present disclosure includes, among other things, directly connecting a bracket assembly to a horizontally facing side of a lateral rail, and directly connecting the bracket assembly to a horizontally facing side of a first side rail of an enclosure assembly. The enclosure assembly holding a plurality of battery arrays of an electrified vehicle between the first side rail and a second side rail.

In another example of the preceding method, the bracket assembly is a first bracket assembly. The method further includes directly connecting a second bracket assembly to a horizontally facing side of the second side rail and to the horizontally facing side of the lateral rail.

In another example of any of the preceding methods, the lateral rail extends from the first side rail to the second side rail.

In another example of any of the preceding methods, the lateral rail interfaces with the first rail along a vertically extending interface. Also, the bracket assembly extends over the vertically extending interface.

In another example of any of the preceding methods, the lateral rail is a first lateral rail that is rearward of the enclosure assembly relative to an orientation of the electrified vehicle.

Another example of any of the preceding methods, includes securing the enclosure assembly to an underbody of the electrified vehicle.

Another example of any of the preceding methods includes securing the first side rail to a driver side vehicle rocker, and securing the second side rail to a passenger side vehicle rocker.

Another example of any of the preceding methods includes using the bracket to hold at least one head of a fastener between the bracket and the horizontally facing side of the lateral rail. The fastener includes a shaft that extends through an aperture in the bracket.

Another example of any of the preceding methods, includes securing the shaft of the fastener to a suspension component of the electrified vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a connected assembly that secures areas of a battery pack. The connected assembly can help the battery pack to withstand a load, such as a side impact load resulting from a pole impact, without exposing components within an interior of the battery pack.

Figure 1:
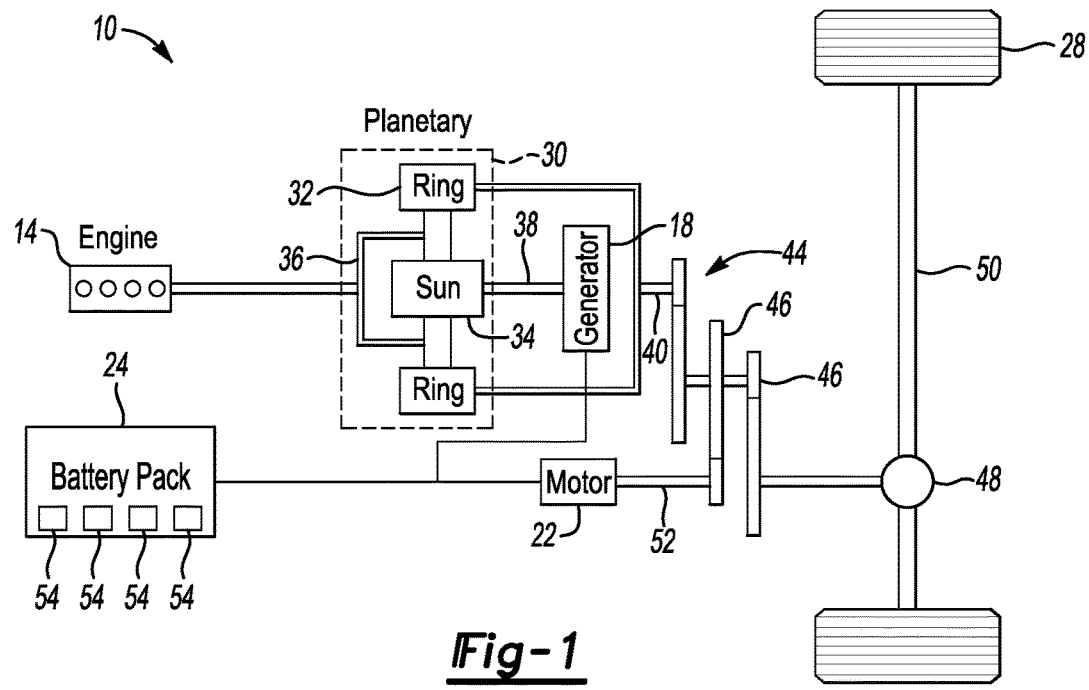
FIG. 1 schematically illustrates an exemplary powertrain of an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to drive the vehicle drive wheels 28. The battery pack 24 includes a plurality of battery arrays 54 each including a plurality of individual battery cells.

Figure 2:
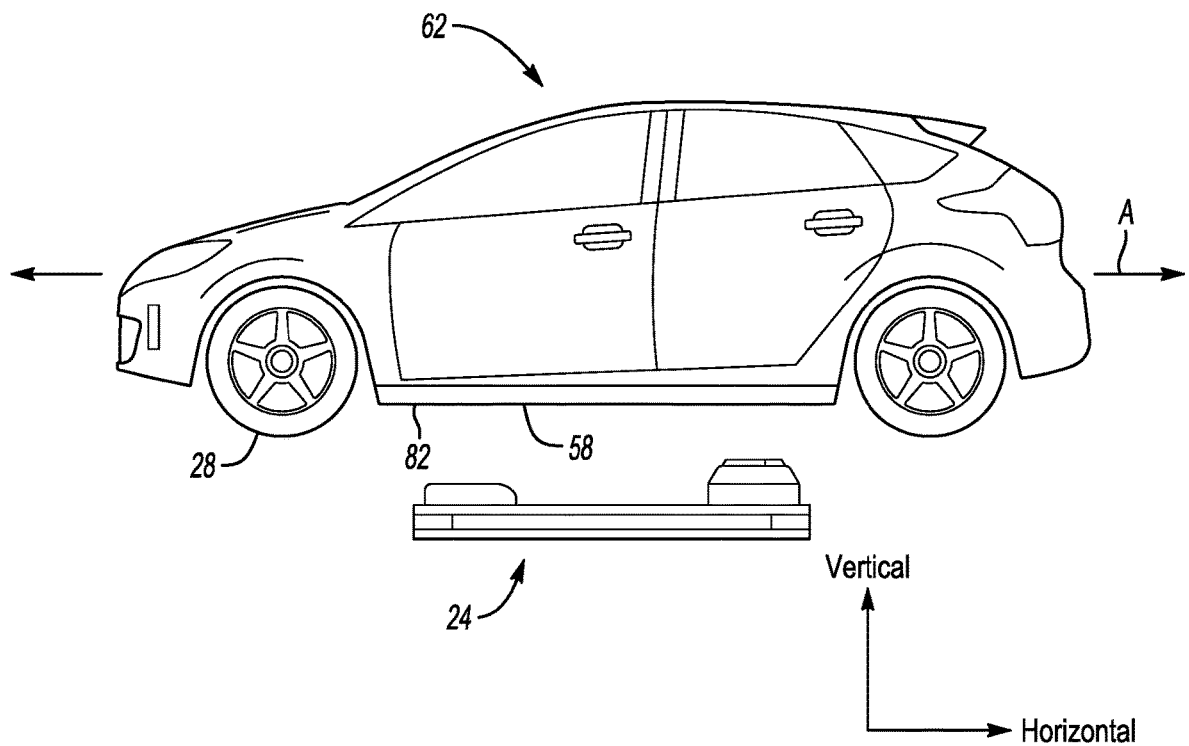
FIG. 2 illustrates a side view of an exemplary electrified vehicle incorporating the powertrain of FIG. 1 and shows how a battery pack can be secured to an underbody of the electrified vehicle.

Referring to FIG. 2, the battery pack 24 can be secured adjacent to an underbody 58 of an electrified vehicle 62. When secured to the underbody 58, the battery pack 24 is vertically below a passenger compartment of the electrified vehicle 62 and horizontally between front and rear wheels of the electrified vehicle 62. Vertical and horizontal, for purposes of this disclosure, are with reference to the general orientation of the electrified vehicle 62 during ordinary operation, and with reference to ground.

Figure 3:
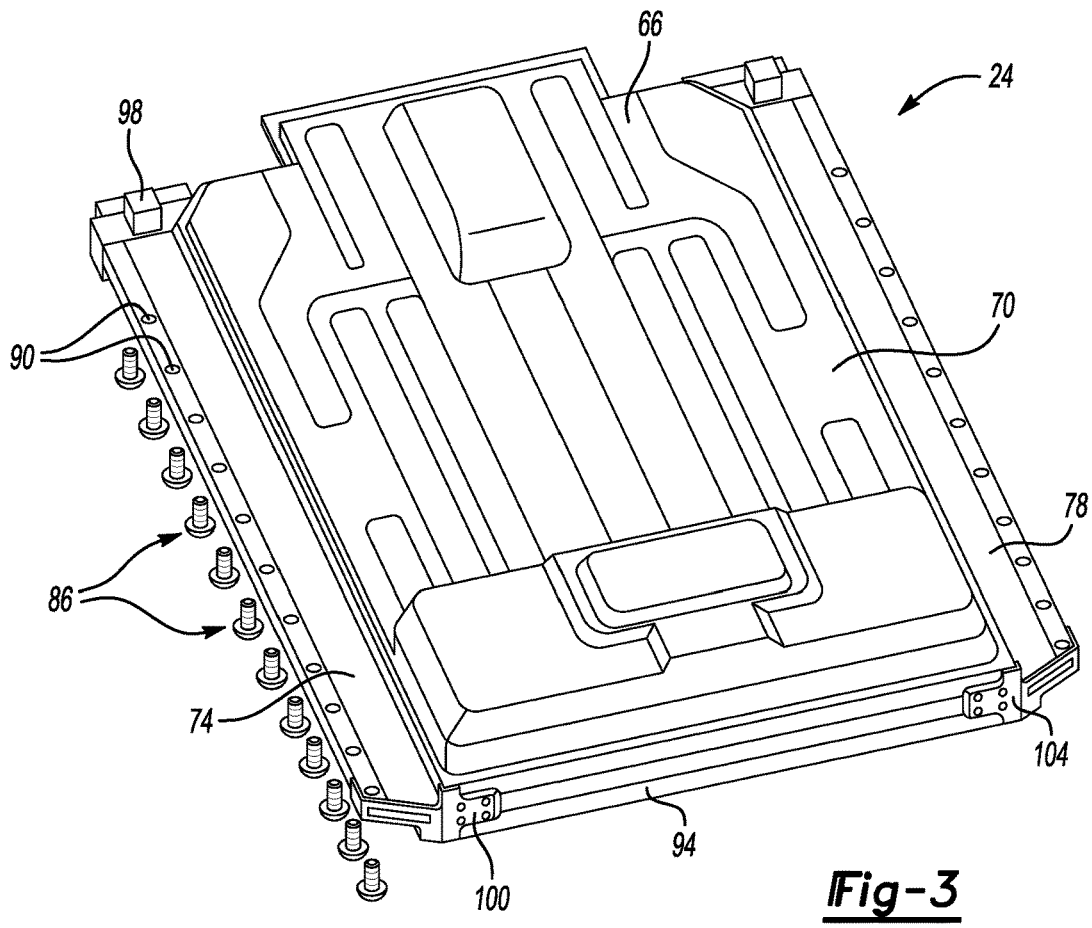
FIG. 3 illustrates a perspective view of the battery pack of FIG. 1.

With reference to FIG. 3, the battery pack 24 includes an enclosure assembly 66 that houses the battery arrays 54. The enclosure assembly 66 includes a cover or lid 70 that is vertically above the battery arrays 54. A first side rail 74 provides a side of the enclosure assembly 66 on a driver side of the battery pack 24. A second side rail 78 provides a side of the enclosure assembly 66 on a passenger side of the battery pack 24. The first side rail 74 and the second side rail 78 can be considered battery rails. The first side rail 74 and the second side rail 78 each extend longitudinally from a forward portion of the electrified vehicle 62 to a rearward portion of the electrified vehicle 62.

To help secure the battery pack 24 to the electrified vehicle 62, the first side rail 74 can be secured to a driver side rocker 82, which is shown in FIG. 2. Mechanical fasteners such as bolts 86 can extend through apertures 90 in the first side rail 74 to threadably engage the driver side rocker 82 thereby securing the first side rail 74 to the driver side rocker 82. Other mechanical fasteners can be used to similarly secure the second side rail 78 to a passenger side rocker of the electrified vehicle 62.

The battery pack 24 further includes a rear lateral rail 94 that extends from the first side rail 74 to the second side rail 78. The rear lateral rail 94 is a first lateral rail that is aft the battery arrays 54 relative to general orientation of the electrified vehicle 62. A forward lateral rail 98 can extend from the first side rail 74 to the second side rail 78. The forward lateral rail 98 is forward the battery arrays 54 relative to a general orientation of the electrified vehicle 62.

The first side rail 74, the second side rail 78, the rear lateral rail 94, and the second lateral rail 98 can be extruded from aluminum, for example. In another example, a metal or metal alloy other than aluminum could be used. Further, the first side rail 74, the second side rail 78, the rear lateral rail 94, and the second lateral rail 98 could be formed by a process other than extrusion.

Figure 4:
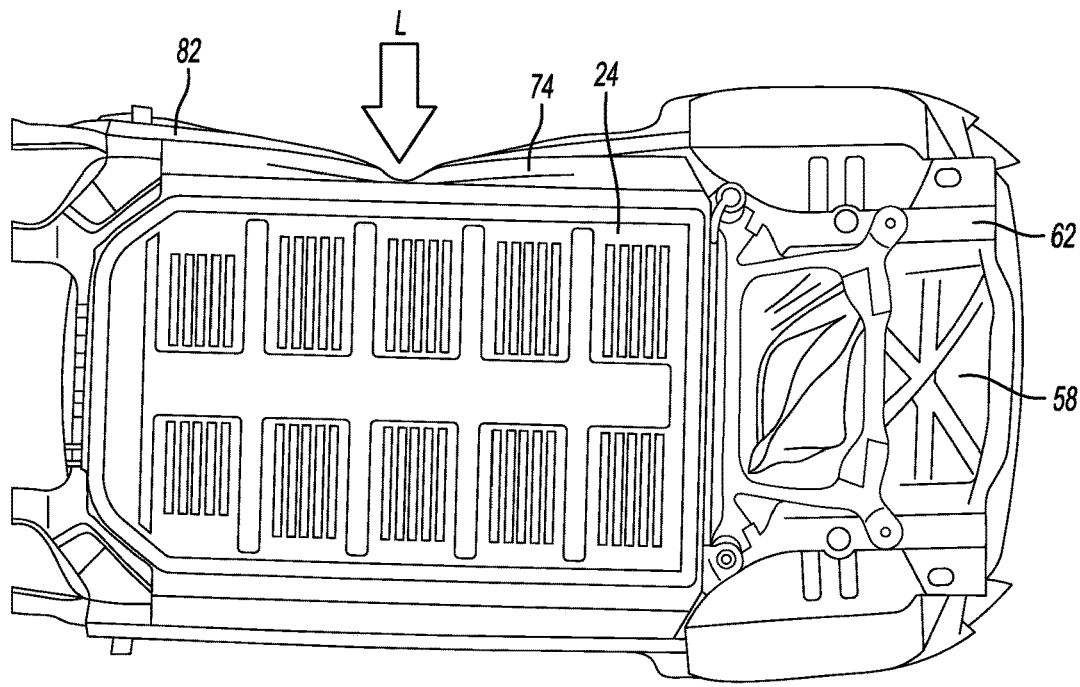
FIG. 4 illustrates a bottom view of a portion of the electrified vehicle when the battery pack is secured to the underbody and after a side impact load has been applied to a driver side of the electrified vehicle.

With reference now to FIG. 4, the battery pack 24 is shown secured adjacent to the underbody 58 after a load L has been applied to a driver side of the electrified vehicle 62. The load L can be a side impact load, for example.

One example of a side impact load includes loads applied to the electrified vehicle 62 when a side of the electrified vehicle 62 contacts a pole. To simulate this contact, the electrified vehicle 62 can be moved relative to a pole until that pole contacts a laterally facing side of the electrified vehicle 62.

The load L is high enough to deform at least portions of the driver side rocker 82 and the first side rail 74. If not accounted for, the load L can cause the first side rail 74 to separate from the rear lateral rail 94, as shown in FIG. 5.

Figure 5:
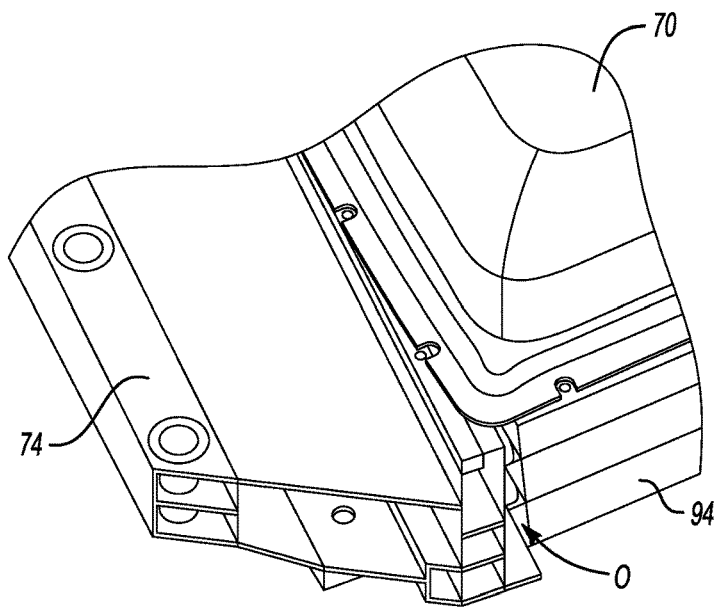
FIG. 5 illustrates a selected portion of the battery pack of FIG. 3 after a side load has been applied without a bracket assembly being used to secure together areas of the battery pack.
Figure 6:
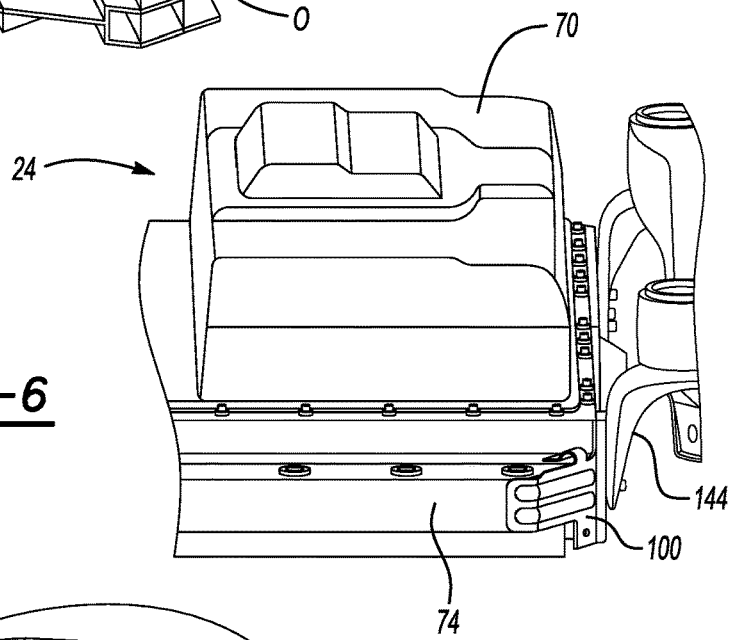
FIG. 6 illustrates a perspective view of selected portions of the battery pack secured to a suspension component of the electrified vehicle.
Figure 7:
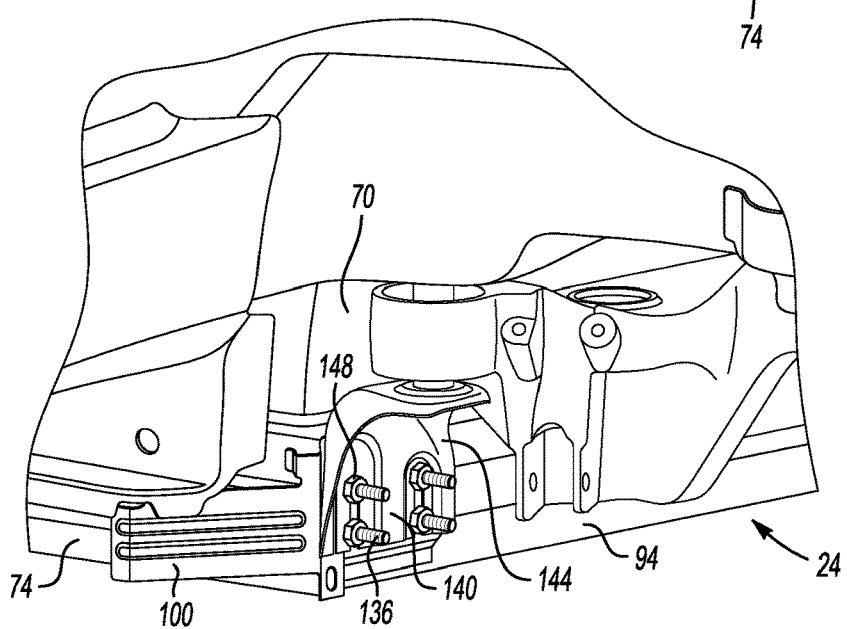
FIG. 7 illustrates another perspective view of the portion shown in FIG. 6.
Figure 8:
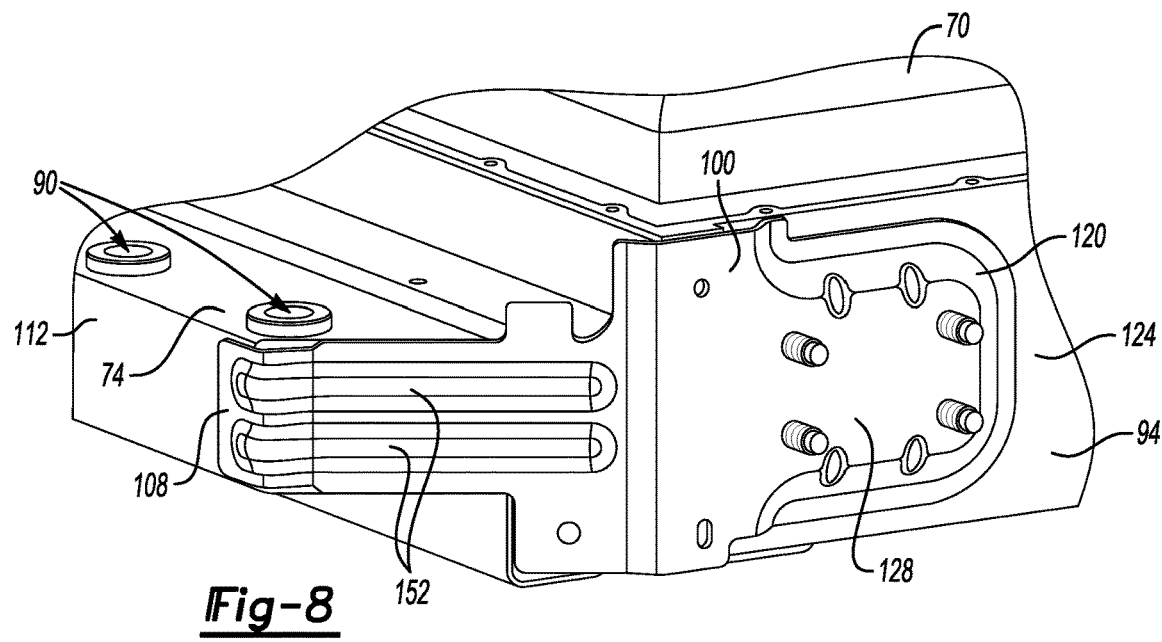
FIG. 8 illustrates a close-up view of a bracket assembly securing together areas of the battery pack.
Figure 9:
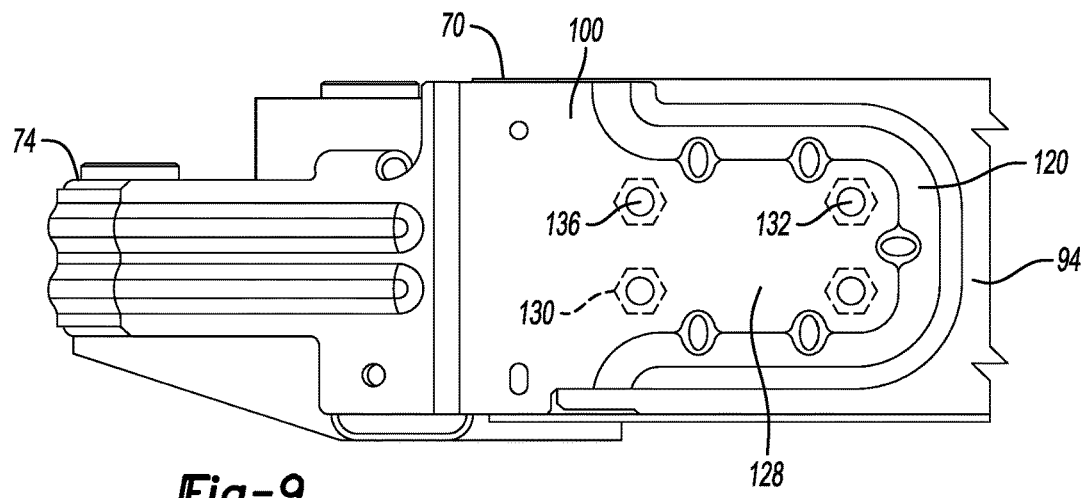
FIG. 9 illustrates an end view of the bracket assembly of FIG. 8.
Figure 10:
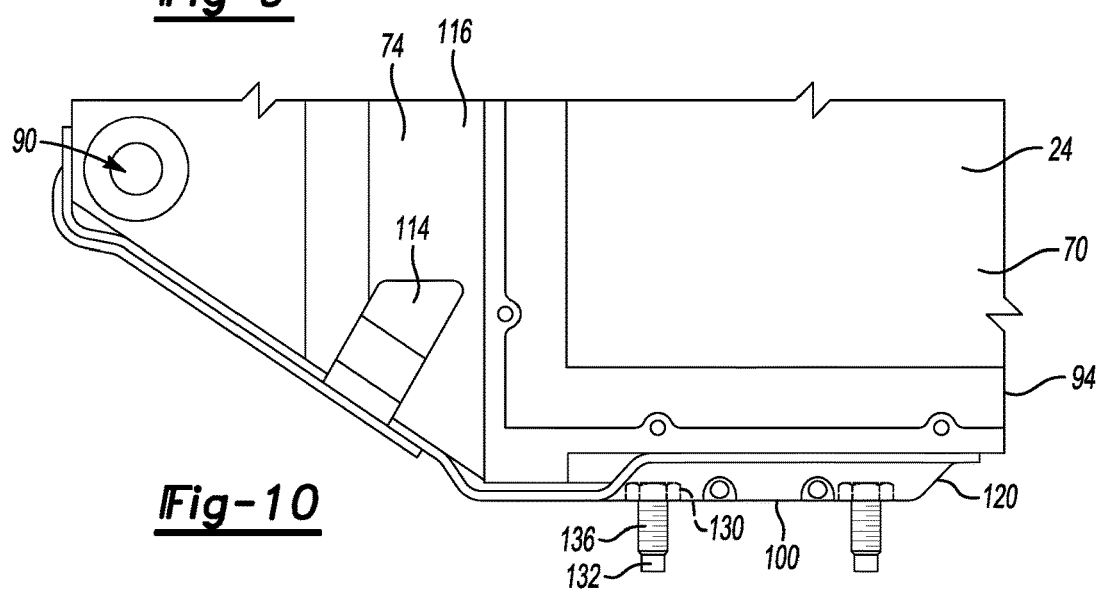
FIG. 10 illustrates a top view of the connected assembly of FIG. 8.

In particular, the first side rail 74 interfaces with the rear lateral rail 94 at a vertically extending interface shown in FIG. 5. The load L, if not accounted for, can result in separation along this interface. The separation can introduce an opening O, which may undesirably expose components within the interior of the battery pack 24, such as, for example, the battery arrays 54.

With reference now to FIGS. 6-10, the battery pack 24 incorporates a connected assembly to reduce the likelihood of the first side rail 74 separating from the rear lateral rail 94 when under a load, such as the side impact load L of FIG. 4.

The connected assembly includes, among other things, a bracket assembly 100 that is directly connected to both the first side rail 74 and the rear lateral rail 94. The bracket assembly 100 is a first bracket assembly in the exemplary embodiment, and is located in the driver side of the electrified vehicle 62. The bracket assembly 100 extends over at least a portion of the vertically extending interface where the first side rail 74 interfaces with the rear lateral rail 94. The first side rail 74 can be joined to the rear lateral rail 94 along the vertically extending interface. The first side rail 74 could be welded to the rear lateral rail 94, for example.

The connected assembly can further include a second bracket assembly 104 that is disposed on a passenger side of the electrified vehicle 62. The second bracket assembly 104 is directly connected to the second side rail 78 and the rear lateral rail 94. The second bracket assembly 104 can inhibit separation of the second side rail 78 from the rear lateral rail 94 due to, for example, an impact load applied to a passenger side of the electrified vehicle 62.

Referring again to the bracket assembly 100, directly connecting the bracket assembly 100 to the first side rail 74 includes, in this example, welding a portion 108 of the bracket assembly 100 to a horizontally facing side 112 of the first side rail 74. The horizontally facing side 112 faces laterally outward away from the vehicle. The bracket assembly 100 is further secured to the first side rail 74 utilizing a portion 114 of the bracket which is welded directly to a vertically facing side 116 of the first side rail.

The bracket assembly 100 is directly connected to the rear lateral rail 94 via welds that secure a flange 120 to a horizontally facing side 124 of the rear lateral rail 94.

The welds securing the bracket assembly 100 to the first side rail 74 and the rear lateral rail 94 can include multiple weld beads to increase stiffness.

During application of a load, such as the load L of FIG. 4, the bracket assembly 100 helps to constrain movement of the first side rail 74 relative to the rear lateral rail 94. This prevents the vertically extending interface between the first side rail 74 and the rear lateral rail 94 from opening as shown in FIG. 5. That is, the bracket assembly 100 helps to prevent shear.

In particular, the bracket assembly 100 can stabilize areas of the battery pack 24 and pull the battery pack 24 away from the impact zone near the where the load L is applied to the electrified vehicle 62.

A portion 128 of the bracket assembly 100 is spaced rearward from the flange 120. This establishes a cup shape in this area of the bracket assembly 100. The cup shape results in an open area between the portion 128 and the horizontally facing side 124 of the rear lateral rail 94 when the flange 120 is secured to the horizontally facing side 124.

The open area can accommodate the heads 130 of fasteners 132. Shafts 136 of the fasteners extend through openings in the portion 128 to project rearward of the portion 128 while the heads 130 are captured between the horizontally facing side 124 and the portion 128.

In the exemplary embodiment, portions of the shafts 136 are threaded. When the battery pack 24 is secured to the electrified vehicle 62, the shafts 136 are each received within a respective slot 140 (FIG. 7) of a suspension component 144 of the electrified vehicle 62. The suspension component is a rear subframe component in this example.

Torqueing down nuts 148 that threadably engage the shafts 136 clamps a portion of the suspension component 144 between the respective nut 148 and the portion 128 of the bracket assembly 100. This can help to secure the bracket assembly 100 relative to the suspension component 144. Since the bracket assembly 100 is secured to the rear lateral rail 94 and the first side rail 74, the securing further helps to hold the battery pack 24 relative to the suspension component 144.

Although the exemplary embodiment describes securing the bracket assembly 100 to the suspension component 144, other embodiments may no secure the bracket assembly 100 to the suspension component 144 or any other suspension component.

In the exemplary embodiment, the bracket assembly 100 incorporates strengthening ribs 152 that are formed into the geometry of the bracket assembly 100. The bracket assembly 100 can be stamped aluminum, or another metal or metal alloy, such as steel. The ribs 152 can be stamped into the bracket assembly 100 to reduce processing time.

Figure 11:
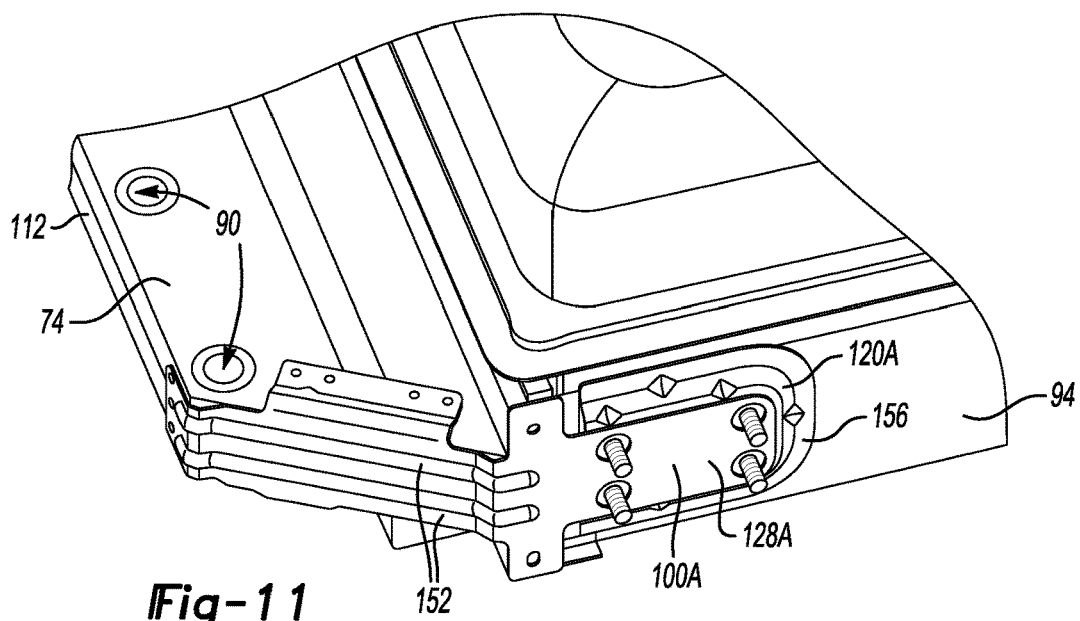
FIG. 11 illustrates a perspective view of a bracket assembly securing together areas of the battery pack according to another exemplary embodiment of the present disclosure.
Figure 12:
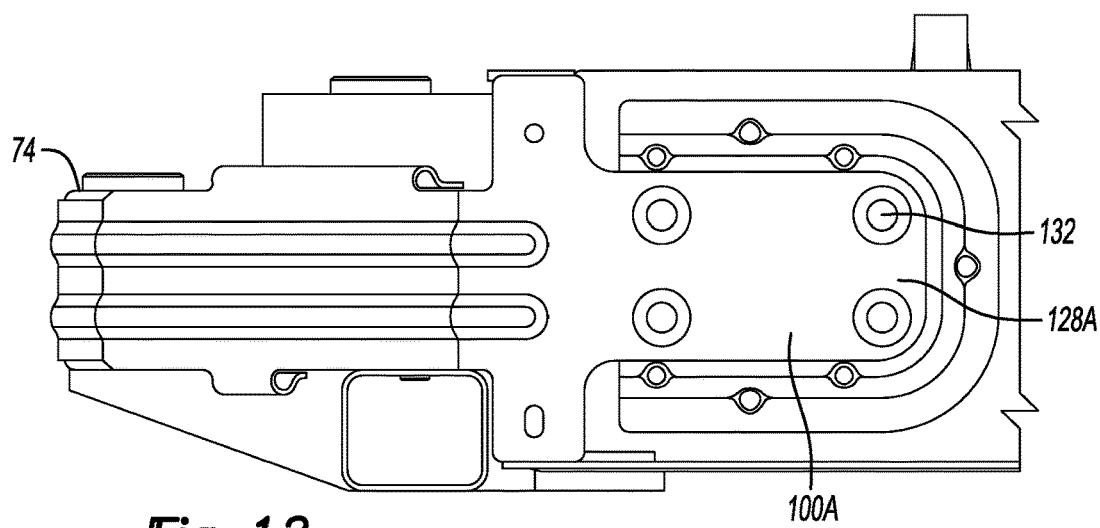
FIG. 12 illustrates an end view of the connected assembly of FIG. 11.
Figure 13:
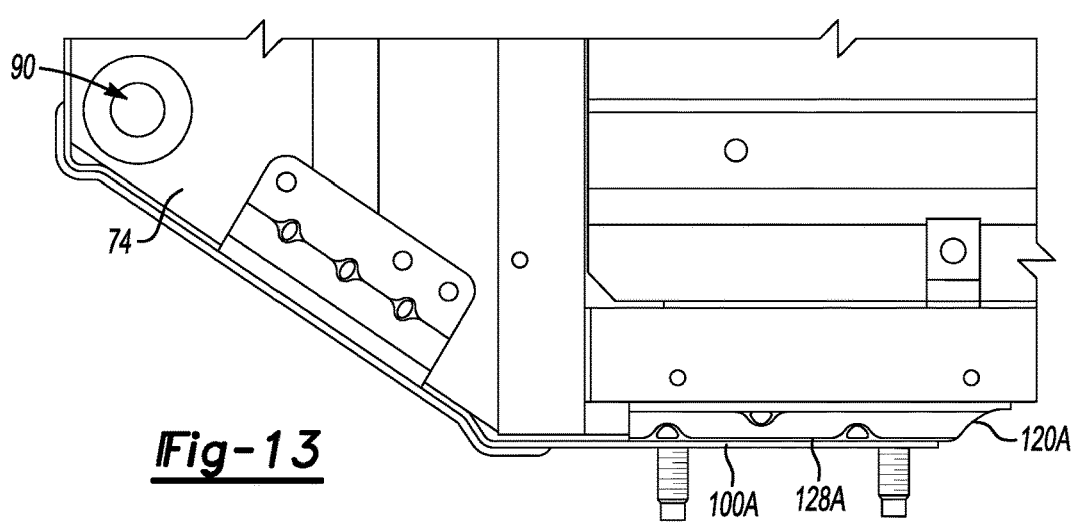
FIG. 13 illustrates a top view of the connected assembly of FIG. 11.

With reference to FIGS. 11-13, another exemplary bracket assembly 100A can be used to secure the first side rail 74 relative to the rear lateral rail 94. The bracket assembly 100A differs from the bracket assembly 100 in that the bracket assembly 100A is a two-piece design.

The bracket assembly 100A includes a cup feature 156 having the flange 120A that is secured to the rear lateral rail 94. The portion 128A is provided by a separate piece of the bracket assembly 100A.

The portion 128A is secured relative to the flange 120A when the fasteners 132 are secured to the suspension component. In some examples, the portion 128A could be spot welded to the flange 120A prior to securing the fasteners 132 to the suspension component 144.

Like the bracket assembly 100, the bracket assemblies 100A can be stamped aluminum, or another metal or metal alloy, such as steel. The ribs 152 can be stamped into the bracket assembly 100A to reduce processing time.

The two-piece design can provide the ability to inspect, for example, a weld that joins together the rear lateral rail 94 and the first side rail 74.

Features of the disclosed examples include a bracket assembly that can help to avoid undesired exposure of components within a battery pack in response to a load, particularly a side load. The bracket can provide relatively accessible attachment and detachment locations.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A connected assembly, comprising:
   first and second side rails of a battery pack of an electrified vehicle, the battery pack including a plurality of battery arrays disposed between the first and second side rails within an enclosure assembly;
   a lateral rail extending from the first side rail to the second side rail; and
   a bracket assembly directly connected to the first side rail and the lateral rail, wherein the lateral rail interfaces with the first rail along a vertically extending interface, wherein the bracket assembly extends over the vertically extending interface.

2. The connected assembly of claim 1, wherein the bracket assembly is a first bracket assembly, and further comprising a second bracket assembly directly connected to the second side rail and the lateral rail.

3. The connected assembly of claim 1, wherein the bracket assembly is directly connected to a horizontally facing side of the first side rail and a horizontally facing side of the lateral rail.

4. The connected assembly of claim 1, wherein the lateral rail is a first lateral rail that is rearward of the enclosure assembly relative to an orientation of the electrified vehicle.

5. The connected assembly of claim 1, wherein the battery pack is secured to an underbody of the electrified vehicle.

6. A connected assembly, comprising:
   first and second side rails of a battery pack of an electrified vehicle, the battery pack including a plurality of battery arrays disposed between the first and second side rails within an enclosure assembly;
   a lateral rail extending from the first side rail to the second side rail;
   a bracket assembly directly connected to the first side rail and the lateral rail; and
   a driver side vehicle rocker and a passenger side vehicle rocker, the first side rail secured directly to the driver side vehicle rocker, the second side rail secured directly to the passenger side vehicle rocker.

7. The connected assembly of claim 1, wherein the bracket is directly connected to a horizontally facing side of the first side rail and a vertically facing side of the lateral rail.

8. The connected assembly of claim 1, wherein the bracket is a single, continuous bracket.

9. The connected assembly of claim 1, further comprising at least one fastener having a head and a shaft extending from the head, wherein the head is held by the bracket between the bracket and the lateral rail, wherein the shaft extends through an aperture in the bracket.

10. The connected assembly of claim 9, further comprising a suspension component of the electrified vehicle, the at least one fastener secured directly to the suspension component.

11. A battery pack connection method, comprising:
    directly connecting a bracket assembly to a horizontally facing side of a lateral rail; and
    directly connecting the bracket assembly to a horizontally facing side of a first side rail of an enclosure assembly, the enclosure assembly holding a plurality of battery arrays of an electrified vehicle between the first side rail and a second side rail,
    wherein the lateral rail interfaces with the first rail along a vertically extending interface, wherein the bracket assembly extends over the vertically extending interface.

12. The battery pack connection method of claim 11, wherein the bracket assembly is a first bracket assembly, and the further comprising directly connecting a second bracket assembly to a horizontally facing side of the second side rail and to the horizontally facing side of the lateral rail.

13. The battery pack connection method of claim 11, wherein the lateral rail extends from the first side rail to the second side rail.

14. The battery pack connection method of claim 11, wherein the lateral rail is a first lateral rail that is rearward of the enclosure assembly relative to an orientation of the electrified vehicle.

15. The battery pack connection method of claim 11, further comprising securing the enclosure assembly to an underbody of the electrified vehicle.

16. The battery pack connection method of claim 11, further comprising securing the first side rail to a driver side vehicle rocker, and securing the second side rail to a passenger side vehicle rocker.

17. The battery pack connection method of claim 11, further comprising using the bracket to hold at least one head of a fastener between the bracket and the horizontally facing side of the lateral rail, the fastener including a shaft that extends through an aperture in the bracket.

18. The battery pack connection method of claim 17, further comprising securing the shaft of the fastener to a suspension component of the electrified vehicle.

* * * * *